US009807225B2

United States Patent
Zörb-Schliefer

(10) Patent No.: US 9,807,225 B2
(45) Date of Patent: Oct. 31, 2017

(54) METHOD FOR PROVIDING A FUNCTION IN A COMPUTER SYSTEM OF A VEHICLE

(71) Applicant: AUDI AG, Ingolstadt (DE)

(72) Inventor: Arne Zörb-Schliefer, Pettstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 14/909,599

(22) PCT Filed: Jun. 20, 2014

(86) PCT No.: PCT/EP2014/001674
§ 371 (c)(1),
(2) Date: May 23, 2016

(87) PCT Pub. No.: WO2015/014424
PCT Pub. Date: Feb. 5, 2015

(65) Prior Publication Data
US 2016/0286029 A1 Sep. 29, 2016

(30) Foreign Application Priority Data

Aug. 2, 2013 (DE) .................. 10 2013 012 998

(51) Int. Cl.
*H04M 3/00* (2006.01)
*H04M 1/725* (2006.01)
(Continued)

(52) U.S. Cl.
CPC ........ *H04M 1/72563* (2013.01); *H04L 67/12* (2013.01); *H04W 8/24* (2013.01); *H04L 67/16* (2013.01)

(58) Field of Classification Search
CPC ... H04M 1/72563; H04M 1/725; H04W 8/24; H04L 67/12; H04L 67/16
(Continued)

(56) References Cited

U.S. PATENT DOCUMENTS

| 8,442,558 B2* | 5/2013 | Mader | H04M 1/6075 455/456.4 |
| 2010/0037057 A1* | 2/2010 | Shim | H04L 63/0823 713/171 |

(Continued)

FOREIGN PATENT DOCUMENTS

| CN | 102079273 A | 6/2011 |
| CN | 102216731 A | 10/2011 |

(Continued)

OTHER PUBLICATIONS

Bose, R. et al., *Morphing Smartphones into Automotive Application Platforms*, IEEE Computer Society (May 2011) 53-61.
Fiehe, C. et al., *Location-Transparent Integration of Distributed OSGi Frameworks and Web Services*, 2009 International Conference on Advanced Information Networking and Applications Workshops, IEEE Computer Society (2009) 464-469.

(Continued)

*Primary Examiner* — Lester Kincaid
*Assistant Examiner* — Sayed T Zewari
(74) *Attorney, Agent, or Firm* — Alston & Bird LLP

(57) ABSTRACT

The invention concerns a method for providing a function by means of a service in a computer system of a given vehicle, with the steps:
making (12) a communication link between the computer system of the vehicle and a mobile terminal,
relaying (14) terminal information from the mobile terminal to the computer system of the vehicle, distinguishing the mobile terminal as a server,
relaying (16) vehicle information from the computer system of the vehicle to the mobile terminal,
providing (18) a list of available services of the mobile terminal for the computer system of the vehicle, wherein the list contains at least one service in addition to services already implemented in the computer system of the vehicle.

9 Claims, 2 Drawing Sheets

(51) Int. Cl.
*H04W 8/24* (2009.01)
*H04L 29/08* (2006.01)

(58) Field of Classification Search
USPC .......... 455/418, 569.2, 575.9; 709/217, 203; 713/171
See application file for complete search history.

(56) References Cited

U.S. PATENT DOCUMENTS

| | | |
|---|---|---|
| 2011/0289186 A1 | 11/2011 | Bell et al. |
| 2012/0259947 A1 | 10/2012 | Park |
| 2012/0303177 A1 | 11/2012 | Jauch et al. |

FOREIGN PATENT DOCUMENTS

| | | |
|---|---|---|
| CN | 102263801 A | 11/2011 |
| CN | 203084201 U | 7/2013 |
| DE | 10 2004 023182 A1 | 12/2004 |
| DE | 10 2006 027767 A1 | 2/2007 |
| DE | 10 2009 056203 A1 | 6/2011 |
| DE | 10 2009 056786 A1 | 6/2011 |
| DE | 10 2010 002 740 A1 | 9/2011 |

OTHER PUBLICATIONS

Miller, B. A. et al., *Home Networking With Universal Plug and Play*, IEEE Communications Magazine (Dec. 2001) 104-109.
Rasheed, Y. et al., *Home Interoperability Framework for the Digital Home*, Intel Technology Journal, vol. 6, No. 4 (Nov. 2002) 5-16.
Sonnenberg, J., *Service and User Interface Transfer from Nomadic Devices to Car Infotainment Systems*, Proceedings of the Second International Conference on Automotive User Interfaces and Interactive Vehicular Applications (Nov. 2010) 162-15.
Sonnenberg, J., *A Distributed In-Vehicle Service Architecture Using Dynamically Created Web Services*, 2010 IEEE 14$^{th}$ International Symposium on Consumer Electronics (2010) 5 pages.
Examination Report for German Application No. 10 2013 012 998.2 dated Mar. 4, 2014.
Written Notice for German Application No. 10 2013 012 998.2 dated Jul. 1, 2015.
Search Report and Written Opinion for International Application No. PCT/EP2014/001674 dated Jul. 17, 2014.
International Preliminary Report on Patentability for International Application No. PCT/EP2014/001674 dated Feb. 4, 2016.
Office Action for Chinese Application No. 201480043560.3 dated Aug. 15, 2016.

* cited by examiner

METHOD FOR PROVIDING A FUNCTION IN A COMPUTER SYSTEM OF A VEHICLE

CROSS-REFERENCE TO RELATED APPLICATIONS

This application is a national stage 371 application of International Application No. PCT/EP2014/001674 filed Jun. 20, 2014, which claims priority to and the benefit of German Application No. 102013012998.2, filed Aug. 2, 2013, the entire contents of which are hereby incorporated by reference.

SPECIFICATION

The invention concerns a method of providing a function in a computer system of a vehicle, as well as a system for providing the function.

Vehicles, especially motor vehicles, generally have a computer system with which a plurality of functions in the vehicle can be provided and/or executed. The computer system of the vehicle moreover usually has an interface by which it can be brought into communication with a mobile terminal, such as a smartphone or the like. In this way, the most various of vehicle states and parameters can be called up and also adjusted, if desired.

In the field of general network programming, Universal Plug and Play (UPnP) or also JINI of the Sun company enable a dynamic determination of functions of the most varied components in a given programming environment. In JINI or also UPnP, an application interface and/or a driver software are transferred from a host network to a new device in order to make use of the services of the host network. In these cases, the user only needs to operate the user interface of the mobile terminal in order to make use of the services of vehicle components, for example.

Thus, it is known how a UPnP server can run on a smartphone and be recognized for example by a UPnP application (UPnP-App) which is running on the computer system of the vehicle. In this way, a UPnP service can be made available to the computer system. Such a system is disclosed, for example, in US 2010/0037057 A1.

It has proven to be a disadvantage that only a limited functionality can be achieved. In particular, only services can be provided which are already known in the computer system of the vehicle.

Thus, the problem which the invention proposes to solve is to improve a method and a system of the above kind so that a broader functionality can be provided.

DETAILED DESCRIPTION

As the solution, the invention proposes a method for providing a function in a computer system of a vehicle with the steps:
making a communication link between the computer system of the vehicle and a mobile terminal,
relaying terminal information from the mobile terminal to the computer system of the vehicle, distinguishing the mobile terminal as a server,
relaying vehicle information from the computer system of the vehicle to the mobile terminal,
providing a list of available services of the mobile terminal for the computer system of the vehicle, wherein the list contains in particular services unknown to the vehicle.

Thanks to the method of the invention, a broader functionality can be achieved in the vehicle by providing in particular new applications from the mobile terminal for the computer system of the vehicle. By contrast with the prior art, especially the principle based on the UPnP server, the invention can also provide services not yet known to the computer system of the vehicle. This is done by providing applications from the mobile terminal.

For this purpose, first of all a communication link is made between the computer system of the vehicle and the mobile terminal. The mobile terminal can be, for example, a smartphone, an iPhone, a tablet computer, a PDA or the like.

The service provided by the mobile terminal enables the providing of a function in the computer system of the vehicle. A function is a sequence of technical instructions which can be executed by the computer system, resulting in a physical event, such as an indication of a vehicle status, an action, especially regarding a driving operation of the vehicle, creating a control command, combinations of these and/or the like. The function generally returns a technical result. The service generally describes a technical, autonomous unit, bundles the interconnected functionalities, especially the functions, into a theme complex, and provides them over a clearly defined interface. Typical examples of services are web services, which make available functionalities for third parties via the communication network, network services, system services, telecommunication services, and/or the like.

Figure 1:
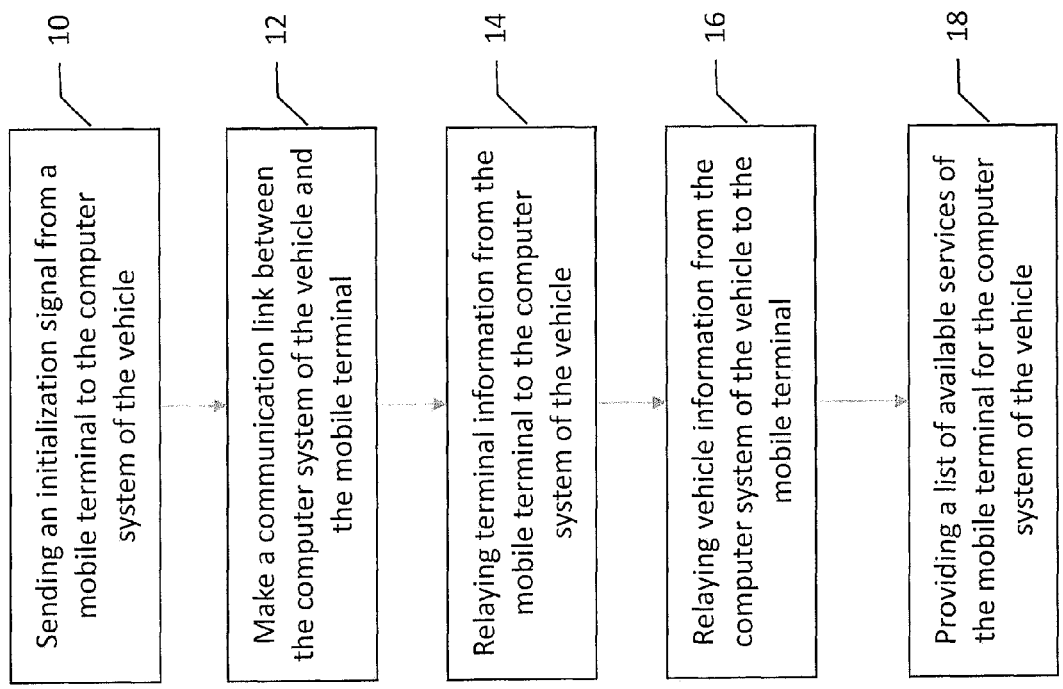
FIG. 1 illustrates a method of providing new application functionality in a vehicle according to an example embodiment of the present invention.
Figure 2:
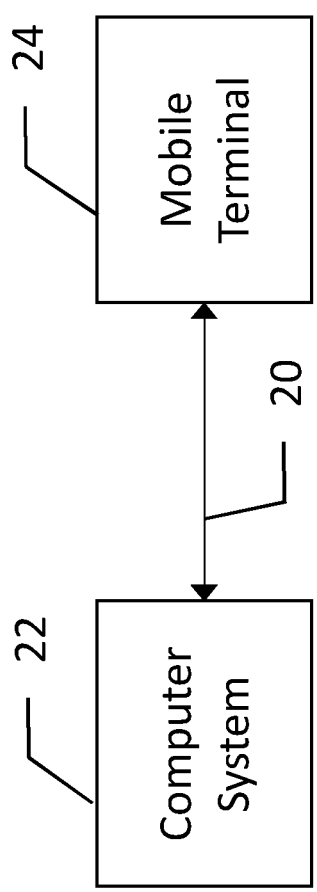
FIG. 2 illustrates a system for providing new application functionality in a vehicle according to an example embodiment of the present invention.

In order to make the communication link 20, which can preferably be a wireless, especially a radio-based communication link, but also a wire-line communication link, it is first of all determined by the communication partners, namely the computer system of the vehicle 22 and the mobile terminal 24, that the other communication partner is present, as shown in FIG. 2. Next, making use of a communication protocol, the communication is produced between the computer system of the vehicle and the mobile terminal. For this purpose, there can be provided for example a polling of protocols until a suitable protocol is found, which enables a proper intended communication between the communication partners.

The mobile terminal then relays terminal information to the computer system of the vehicle, which distinguishes the mobile terminal as a server. The terminal information can be formed, for example, by a special encoding, a code word or the like. The computer system of the vehicle receives the terminal information and determines whether the communication partner, here the terminal, is a server. For this, the terminal information is evaluated.

Next the computer system of the vehicle relays to the mobile terminal vehicle information, which can be for example a vehicle identification. The vehicle information allows the mobile terminal to determine what kind of vehicle is involved. For this purpose, provided the mobile terminal has the corresponding files or can do a search by a global network such as the Internet, corresponding required vehicle data is determined. Based on the vehicle data determined, the mobile terminal creates a list of available services of the mobile terminal, especially those suitable for the computer system of the vehicle, which are then provided for the computer system of the vehicle. The list of services compiled by the mobile terminal is not limited to services which are already known in the computer system of the vehicle. In particular, services can be provided which are unknown to the vehicle, that is, new services with respect to the computer system of the vehicle. Based on the sequence of the method, the invention is no longer limited to services known on the computer system. Preferably, services are selected by the mobile terminal which are compatible with a technological base of the vehicle.

Furthermore, it can be provided that a user interface is provided to the computer system of the vehicle by the mobile terminal. This allows the servicing to be further improved. The user interface as well is preferably adapted to or compatible with the technological base of the vehicle. This allows making available new services for the computer system in easy and user-friendly way.

Another embodiment calls for using an IP-based communication link as the communication link. This allows the use of a variety of standardized communication protocols and to make a communication link in highly flexible manner between different terminals on the one side and different computer systems of vehicles on the other side. Furthermore, communication links to more than two communication partners can also be made, of course. For this purpose, it can be provided that the computer system of the vehicle and/or also the mobile terminal each have a fixed identification. This can be, for example, an IP number. Furthermore, it can be provided of course that an identification of at least one of the communication partners is randomly chosen from a predetermined range of predetermined identifications and the corresponding communication partner checks to see whether this identification is already occupied in the intended communication link. If so, another identification is chosen from the predetermined identifications and another check is made. This process repeats until a correspondingly free identification has been found.

According to another embodiment, it can be provided that before making the communication link of the computer system of the vehicle and/or the mobile terminal, an initialization signal is sent out. With the initialization signal, it is possible for one communication partner to tell other communication partners of its presence and its ability to communicate. An initialization signal can consist for example of a code sequence, which can contain besides a code sequence identifying the signal as an initialization signal also an identification or call sign of the corresponding communication partner. It can be provided that the initialization signal is sent out as a pulse at regular intervals, in particular when there is no communication link to any other communication partner. Of course, it can also be provided that an authorization by a user is required in order to send out the initialization signal. This can be done, for example, by a user entry on the mobile terminal or also on the computer system of the vehicle.

According to another embodiment it is proposed that the computer system of the vehicle determines usage data for the use of the services of the mobile terminal provided by means of the list. Usage data is preferably data which is provided by the computer system of the vehicle for a respective service so that this service can execute a desired function. This can occur, for example, in that the computer system of the vehicle after making the communication link requests corresponding information from the mobile terminal by means of which the computer system is informed as to which usage data should be provided for a respective service. The usage data can comprise, for example, data of sensors of the vehicle, control parameters, configuration data, or the like.

In another embodiment, it is provided that the computer system of the vehicle calls up the list of services of the mobile terminal. For this purpose, the computer system relays a corresponding command to the mobile terminal, which thereupon relays the particular list via the communication link to the computer system of the vehicle.

A modification calls for the relaying of the vehicle information by the computer system of the vehicle to the mobile terminal to involve a relaying of services implemented in the computer system of the vehicle. In this way, the mobile terminal is informed as to the range of services of the computer system of the vehicle and can use this for further evaluations, especially for determining of services not implemented in the computer system of the vehicle.

It has proven to be especially advantageous for the list of services of the mobile terminal to be compiled such that it only contains services in addition to services already implemented in the computer system of the vehicle. In this way, the list can be highly compressed and only contain the added benefit to the computer system of the vehicle, because the list preferably contains only services unknown to the computer system of the vehicle, that it, services not implemented in the computer system of the vehicle. This not only reduces the data volumes, but can also reduce communication capacity.

Moreover, the invention proposes a system for the providing of a function, with a computer system of a vehicle and with a mobile terminal, wherein the system is set up to carry out the method of the invention as described above. In this way, the benefits provided by the method according to the invention can be achieved with the system.

Further advantages and features will be found in the following description of a sample embodiment. The sample embodiment depicted in the figure serves only to explain the invention and shall not restrict it.

The single figure shows a schematic sequence for a method according to the invention. The method begins in step 10 with the sending of an initialization signal from a mobile terminal, which in the present case is configured as a smartphone. A receiver, which is connected to a computer system of a given vehicle, allows the computer system to receive initialization signals. The receiver is combined with a transmitter, so that the computer system can produce a communication link to a communication partner, here, the smartphone. The communication link in the present case is a short-range radio connection using the WLAN standard. The communication link is therefore an IP-based communication link. After the computer system has received the initialization signal of the smartphone by means of the transceiver, a communication link is made according to a WLAN standard between the computer system of the vehicle and the mobile terminal according to step 12, which follows step 10.

The method then continues with step 14, wherein the smartphone relays terminal information to the computer system via the communication link, distinguishing the smartphone as a server. The computer system receives the terminal information, evaluates it, and adapts the communication to the smartphone so that it operates as a server.

In a following step, step 16, the computer system of the vehicle relays vehicle information to the smartphone. With the vehicle information, the smartphone can ascertain which technological base is available in the vehicle or in the computer system of the vehicle. For this purpose, the smartphone can resort to its own database stored in the smartphone itself. Alternatively or additionally, it can also be provided that the smartphone makes contact with a global communication network and calls up the appropriate required data according to the vehicle information. The vehicle information can be, for example, a vehicle type, a vehicle identification number, such as a chassis number, or the like.

After the vehicle information and further appropriate information regarding the vehicle and the computer system is available in the smartphone, according to step 18 there is provided a list of available services of the smartphone for the computer system of the vehicle, the list containing at least one service in addition to the services already implemented in the computer system of the vehicle. In particular, the list contains services which are unknown, i.e., new to the computer system of the vehicle. Unlike a setup as a UPnP server, the invention also makes possible a use of services unknown to the vehicle. For this purpose, along with the list a user interface is also provided in this sample embodiment, which is compatible with the user interface of the computer system of the vehicle.

In an alternative embodiment it can be provided that the providing of the list of available services is done by the calling up of the list by the computer system of the vehicle from the smartphone.

The aforementioned sample embodiment serves only to explain the invention and should not limit it. In particular, features and sample embodiments can of course be combined with each other in any desired manner, in order to arrive at further embodiments of the invention as needed.

In particular, features relating to the method can of course be applied accordingly to features of the device and vice versa. Furthermore, the initialization can also be done in dual fashion in that the vehicle or the computer system of the vehicle sends out an initialization signal, which is received and evaluated by the mobile terminal.

The invention claimed is:

1. Method for providing a function by means of a service in a computer system of a given vehicle, with the steps:
    making a communication link between the computer system of the vehicle and a mobile terminal,
    relaying terminal information from the mobile terminal to the computer system of the vehicle, distinguishing the mobile terminal as a server,
    relaying vehicle information from the computer system of the vehicle to the mobile terminal, wherein the relaying of the vehicle information by the computer system of the vehicle to the mobile terminal involves a relaying of services implemented in the computer system of the vehicle,
    retrieving vehicle configuration information corresponding to the vehicle information from a global network according to the vehicle information to facilitate communication with the vehicle computer system;
    generating a list of available services from the global network based on the vehicle configuration information and the services implemented in the computer system of the vehicle;
    providing the list of available services of the mobile terminal for the computer system of the vehicle, such that the list contains at least one service unknown to the vehicle in addition to services already implemented in the computer system of the vehicle, in that the list of services is compiled such that it only contains services in addition to services already implemented in the computer system of the vehicle, and the services enable a providing of a function in the computer system of the vehicle, and
    calling up of the list of services of the mobile terminal by the computer system of the vehicle, in order to make use of the at least one service not known to the vehicle by using a web service which makes the functionalities available via the communication network.

2. Method according to claim 1, characterized in that a user interface is provided to the computer system of the vehicle by the mobile terminal.

3. Method according to claim 2, characterized in that the user interface is compatible with the computer system of the vehicle.

4. Method according to claim 1, characterized in that an IP-based communication link is used as the communication link.

5. Method according to claim 4, characterized in that the computer system of the vehicle and/or the mobile terminal independently select an IP address.

6. Method according to claim 1, characterized in that, before making the communication link of the computer system of the vehicle and/or the mobile terminal, an initialization signal is sent out.

7. Method according to claim 1, characterized in that the computer system of the vehicle determines usage data for the use of the services of the mobile terminal provided by means of the list.

8. The method of claim 1, further comprising:
    determining, by the computer system, usage data for the use of the at least one service, wherein the usage data comprises at least one of data from sensors of the vehicle, control parameters, or configuration data.

9. A system comprising a computer system of a vehicle and a mobile terminal, wherein the computer system is configured to:
    make a communication link between the computer system of the vehicle and the mobile terminal;
    relay terminal information from the mobile terminal to the computer system of the vehicle, distinguishing the mobile terminal as a server;
    relay vehicle information from the computer system of the vehicle to the mobile terminal, wherein the relaying of the vehicle information by the computer system of the vehicle to the mobile terminal involves relaying of services implemented in the computer system of the vehicle;
    retrieve vehicle configuration information corresponding to the vehicle information from a global network according to vehicle information to facilitate communication with the vehicle computer system;
    generate a list of available services from the global network based on the vehicle configuration information and the services implemented on the computer system of the vehicle;
    provide the list of available services of the mobile terminal for the computer system of the vehicle such that the list contains at least one service unknown to the vehicle in addition to services already implemented in the computer system of the vehicle, in that the list of serves is compiles such that it only contains services in addition to services already implemented in the computer system of the vehicle, and the services enable a providing of a function in the computer system of the vehicle; and call up the list of services of the mobile terminal by the computer system of the vehicle in order to make use of the at least one service not known to the vehicle by using a web service which makes the functionalities available via the communication network.

* * * * *

UNITED STATES PATENT AND TRADEMARK OFFICE
CERTIFICATE OF CORRECTION

PATENT NO. : 9,807,225 B2
APPLICATION NO. : 14/909599
DATED : October 31, 2017
INVENTOR(S) : Zorb-Schliefer Page 1 of 1

It is certified that error appears in the above-identified patent and that said Letters Patent is hereby corrected as shown below:

In the Claims

Column 6,
Lines 58-67, "provide the list of available services of the mobile terminal for the computer system of the vehicle such that the list contains at least one service unknown to the vehicle in addition to services already implemented in the computer system of the vehicle, in that the list of serves is compiles such that it only contains services in addition to services already implemented in the computer system of the vehicle, and the services enable a providing of a function in the computer system of the vehicle;"
Should read:
--provide the list of available services of the mobile terminal for the computer system of the vehicle such that the list contains at least one service unknown to the vehicle in addition to services already implemented in the computer system of the vehicle, in that the list of services is compiled such that the list of services only contains services in addition to services already implemented in the computer system of the vehicle, and the services enable provision of a function in the computer system of the vehicle;--.

Signed and Sealed this
Seventh Day of August, 2018

Andrei Iancu
*Director of the United States Patent and Trademark Office*